J. McC. MILLER.
CONTROL MEANS FOR ORDNANCE.
APPLICATION FILED JAN. 3, 1919.

1,360,664.

Patented Nov. 30, 1920.

Inventor
J. McC. Miller
By P. H. Blair
Attorney

J. McC. MILLER.
CONTROL MEANS FOR ORDNANCE.
APPLICATION FILED JAN. 3, 1919.

1,360,664.

Patented Nov. 30, 1920.
5 SHEETS—SHEET 2.

Inventor
J. M<sup>c</sup>C. Miller
By Attorney

UNITED STATES PATENT OFFICE.

JUSTIN McCARTHY MILLER, OF BALTIMORE, MARYLAND, ASSIGNOR TO THE GOVERNMENT OF THE UNITED STATES.

CONTROL MEANS FOR ORDNANCE.

1,360,664.   Specification of Letters Patent.   Patented Nov. 30, 1920.

Application filed January 3, 1919. Serial No. 269,507.

*To all whom it may concern:*

Be it known that I, JUSTIN MCCARTHY MILLER, a citizen of the United States, residing at Baltimore, Maryland, have invented new and useful Improvements in Control Means for Ordnance, of which the following is a specification.

This invention relates to control means for ordnance whereby the position of a gun or other member may be controlled in elevation and train from a distant point, and once there, stabilized and held constantly on any desired point. It also concerns an ordnance control means adapted to establish and maintain a predetermined relation between a sighting member and ordnance sighted thereby, regardless of movements of the body on which the ordnance is mounted.

It is a purpose of this invention to regulate and control the position of distant members, such as guns, searchlights, or ordnance in general, by means of a common directing member which is intended to be constantly sighted or gyroscopically or otherwise held on some predetermined point, either a target, an artificial horizon, or the like. This directing member may be mounted adjacent one of the members controlled thereby, or, more preferably, may be mounted at some elevated point, such as in the fighting tops. The invention further aims, after having regulated the position of the members from the common directing member, to thereafter maintain such members in a predetermined relation to the directing member.

It further aims to provide a means that will enable guns, when directed by the common directing means and brought into the proper relation to the directing means, to be automatically fired, which firing, however, cannot take place unless all the members are in the predetermined relation to the directing member. The invention herein concerned is adapted to be applied to the control of guns, searchlights or ordnance in general without making any changes in the control means now generally applied thereto, so that the advantages of this system may be obtained so long as possible, but, should parts of this system become disabled during action, the older and less efficient methods of control may be resorted to.

Other objects of this invention will be in part obvious from the annexed drawings and in part indicated in connection therewith by the following analysis of this invention.

Drawings depicting a preferred form of my invention have been annexed as a part of this disclosure, and in such drawings, like characters of reference denote corresponding parts throughout all the views, of which.

In describing one embodiment of my invention, I will first consider the mechanism which is located in the fighting tops or in some other advantageously located point, which mechanism serves as a means of controlling the position of a gun or other ordnance.

Figure 1:
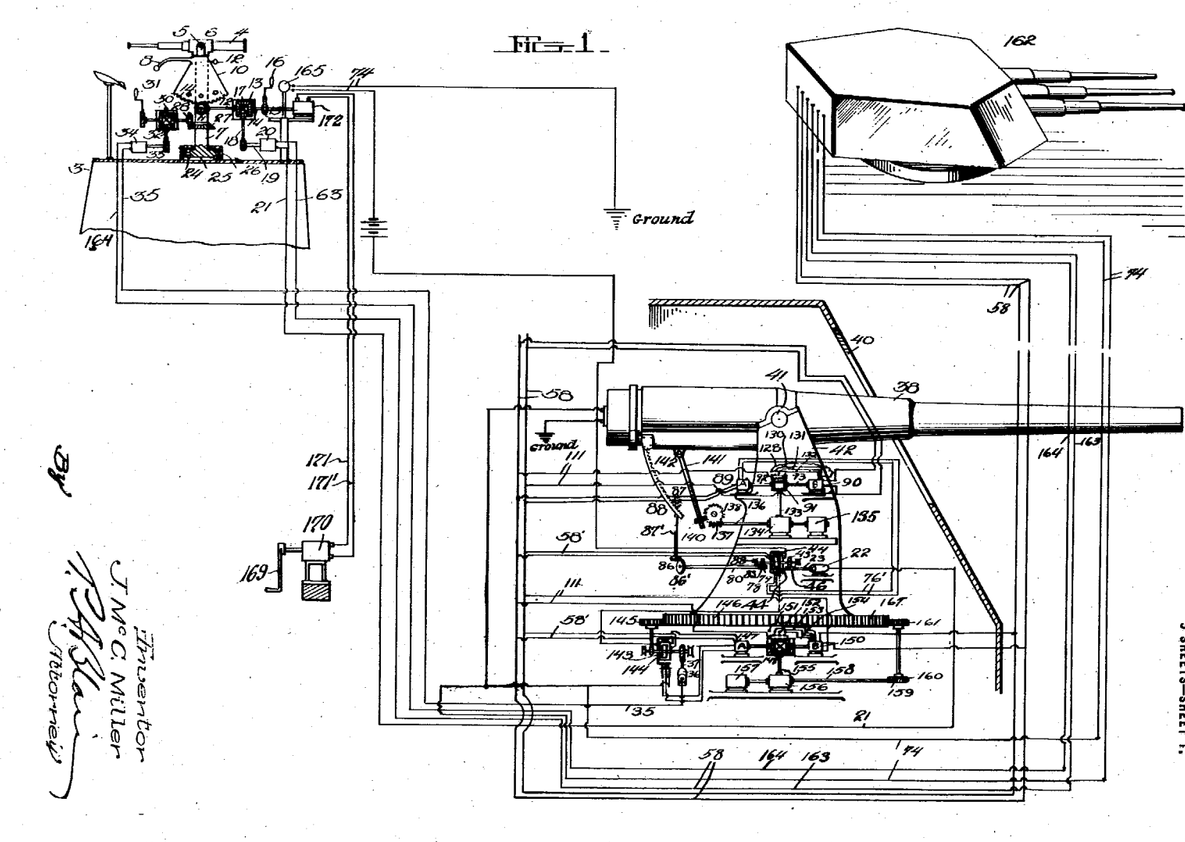
Figure 1 is a diagrammatic view, showing the general arrangement of the various elements.

In a fighting top 3, or elsewhere as found desirable, a telescope 4, which may be gyroscopically or otherwise stabilized, or other means for establishing a fixed plane of reference, is disposed, which telescope is provided with bearings 5 in a yoke 6, at the upper end of a rotatable pillar 7, and by means of an arm 8 is adapted to be moved about the bearings 5 in a vertical plane. A gear segment 10, secured to telescope 4, so as to move therewith, meshes with a gear (not shown) fixed on the same shaft as the gear 11, and motions of the telescope in a vertical plane are thus transmitted to said gear 11. Gearing leads from gear 11 and is connected with a shaft 12 leading into one side of a differential gear system 13. A shaft 14 leading into the other side of this differential is operated through a worm drive 15 by handle 16. The purpose of having the differential gear system 13 will later be described, but for the present it need just be stated that the arrangement is such that the resultant motion of the differential gear system is communicated in the usual way to a gear 17 on the outside of the differential casing. Suitable gearing leads from this gear 17 onto a shaft 18, then by means of the worm and pinion drive, motion is transmitted along shaft 19 into one side of an electric synchronous or step by step transmitter 20.

Synchronous transmitters of this type are old and well-known in the art, and it need only be stated by way of explanation that mechanical motion brought into the transmitter 20 through shaft 19 is changed into corresponding electrical impulses. These impulses are transmitted through the electric cable 21 to a synchronous repeater 22, mounted preferably in the turret adjacent the guns therein, which repeater 22, receives the electrical impulses on one side, and converts them into mechanical motion on the other side, the final effect being that the movement of the gear 17 in one direction or the other is reproduced in kind and quantity on the shaft 23, leading from the repeater. The transmitter 20 and repeater 22 repeat only the movements in "elevation" of the telescope, that is, movements in a vertical plane, so are called respectively the "elevation transmitter" and "elevation repeater."

The pillar 7, to which the telescope 4 is pivoted, is rotatably mounted on bearings 24 and 25, in a casing 26, so that it may move in "train," that is, in a horizontal plane. Beveled gear 27 is secured to the pillar 7 and a gear 28, meshing with the gear 27, operates a shaft which leads into one side of a differential gear system 30. The opposite side of this differential gear system is controlled by means of a handle 31 connected with suitable gearing, and gear 32, mounted on the outside of the differential casing, reproduces in the usual way the resultant motion of the differential system 30. This gear 32 is connected through suitable gearing to a shaft 33, which leads into one side of a synchronous transmitter 34, and mechanical motion thus received is sent forward from the transmitter 34 through a cable 35 to a synchronous repeater 36, preferably mounted adjacent the guns in the turret. This repeater 36 is thus adapted to repeat on the shaft 37, leading therefrom, any motions originally made in "train" by telescope 4.

I have now described the means which is shown on the drawing as mounted in the fighting top 3, and the purpose of which is to regulate or adjust the position of a gun or other ordnance, and while I have referred to the telescope 4 as mounted in the fighting top 3 at a point remote from the members controlled thereby, it is of course evident that, if desired, I may mount the telescope adjacent one or more of such members. I will next describe the mechanism mounted adjacent the guns in the turret for controlling the position of the same.

A gun 38, mounted in the turret 40, is adapted to move in "elevation" about bearing 41 on a mount 42. The elevation repeater 22 is suitably disposed in the turret 40 adjacent the gun and shaft 23 leading therefrom is connected by a system of gearing 43 to a cup-shaped circuit controlling member 44, mounted on a shaft 45 so that movement of shaft 23 rotates 44. This member 44, being operated by movements in "elevation" of the telescope 4, is known as the "elevation telescope cylinder" and forms part of a so-called "hunting" device designated broadly as 46 and shown more in detail in Figs. 2, 3 and 4. The manner in which it controls certain circuits will be hereinafter brought out.

Figure 2:
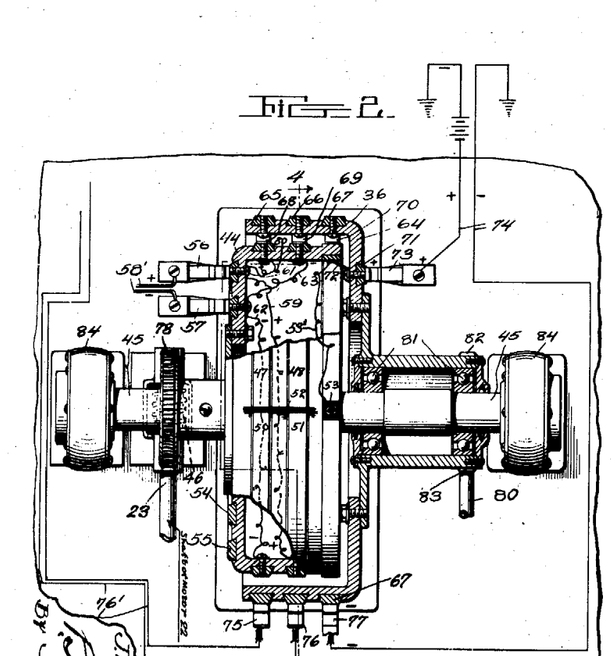
Fig. 2 is a top plan view, part in section, of the "hunting" device.

Referring now especially to Fig. 2, the telescope cylinder 44 therein shown is a cup-shaped member, made of rubberoid or some other insulating material, and carries on its outer face two pairs of contact arcs 47, 48, 50, and 51. These contact arcs are semi-circular bands of copper or other suitable conducting material, secured in grooves in the telescope cylinder 44, and are separated at their adjacent ends by suitable insulation. One of these bands of insulation, shown at 52 in Fig. 2, forms the so-called "neutral point" of the "hunting" device, all of which will be explained more in detail later on. In line with the "neutral point" 52, and to one side thereof, a copper firing contact 53 is provided, which firing contact is of greater width than the "neutral point" 52 and is secured in a recess in the telescope cylinder in any suitable manner.

Arcs 47 and 48 are connected to opposite sides of a circuit so are of opposite polarity, the same being true of arcs 50 and 51. At the same time, arcs 47 and 50 are of opposite polarity, as are arcs 48 and 51, so that contact made between arcs 47 and 48 would close at this point a circuit in which current would tend to flow in one direction, while a contact made across arcs 50 and 51 would close at this point a circuit in which current would tend to flow in the opposite direction. To the side face of the telescope cylinder 44, two circular contact rings 54 and 55 are provided, made of copper or other suitable conducting material, and these rings coöperate with spring pressed contact fingers 56 and 57, connected to the outside circuit 58'. Wires 59 and 60 connect at one end to a conducting screw 61 disposed within the telescope cylinder, and connected to the contact arc 55. The opposite end of these wires is connected through similar screws to contact arcs 51 and 47. In the same way wires 62 and 63 furnish electrical connection between the contact arc 54 and contact arcs 48 and 50. By the means just described, current brought from the outside circuit 58 into the telescope cylinder 44 through the contact fingers 56 and 57, by means of the conductors 58', is led to the respective contact arcs 47, 48, 50 and 51, so that these arcs are appropriately energized.

As may be seen in Fig. 2, a second cup-shaped member 64 embraces the telescope cylinder 44. This member 64 forms the second element of the "hunting" device, and is known as the "elevation contact carrier member." Member 64 is provided on its outer face with contact rings 65, 66 and 67, which rings are secured by means of screws or the like in grooves in the outer face of the member 64, which member is made of rubberoid or some other non-conducting material. Spring contact fingers 68 and 69 are secured to the under side of the contact carrier member 64 and bear against the contact rings 47 and 48, or as hereinafter to be described against the neutral point 52, or, under still other conditions against contact rings 50 and 51.

To the side face of the contact member 64, a contact ring 71 is secured in a groove. A spring contact finger 72 is mounted on the inside of the contact member 64, and has electrical connection with the contact ring 71. With this contact ring 71, a spring contact finger 73 has sliding engagement, which contact finger is connected to the firing circuit 74. The arrangement is such that when the firing contact 53 is moved around into contact with the finger 70, the finger 72 is contacting therewith from below, and circuit is closed at this point from the finger 73, contact ring 71, spring finger 72, firing contact 53, and finger 70, onto the contact ring 67. Spring fingers 75, 76 and 77 have sliding contact respectively with the contact rings 65, 66, and 67. Finger 77 is connected to the firing circuit 74, and completes the circuit through contact ring 67 in the manner heretofore described. It will be understood that this firing circuit 74 is only closed through the telescope cylinder by the contact carrying member when the firing contact 53 has been moved around so as to provide electrical connection with finger 70.

Fingers 75 and 76 are connected to the opposite sides of a circuit 76' which leads to the armature of a motor in a manner hereinafter to be described, and when the contact fingers 68 and 69 are not resting on the neutral point 52, current is flowing in one direction or the other in the circuit 76' including the contact fingers 75 and 76.

A worm gear 78 is attached to the shaft 45 to which the telescope cylinder 44 is secured and a worm 23, meshing with said worm gear 78, is adapted to transmit motion to the telescope cylinder 44 through a shaft 23 and intermediate gearing.

The contact carrier member 64 is mounted to turn on bearings 81 surrounding the shaft 45 and a worm gear 82 receiving motion from a worm 83, is thereby adapted to move the contact carrier member 64 in one direction or the other. Supporting bearings 84 for shaft 45 are provided on either side of the telescope cylinder and contact carrier member.

It may thus be seen that if fingers 68 and 69 are resting on the neutral point 52, at which time the firing circuit 74 is closed through firing contact 53, and finger 70, the contact carrier member 64 may be moved by means of worm 83, mounted on shaft 85, meshing with the worm gear 82, to move the contact fingers 68 and 69 away from the neutral point 52 and the contact finger 70 away from the firing contact 53. Or, motion may be transmitted through the shaft 23 and worm 79 to move the worm gear 78, thus moving the telescope cylinder 44 and carrying the "neutral point" 52 to one side or the other of the fingers 68 and 70.

Referring now to Fig. 1, it may be seen that the shaft 80 carrying the worm 79 is operated by suitable gearing 86, through a gear 87, which meshes with a gear segment 88, secured to the frame in which the guns of the turret, gun 38 only being shown, are carried. These guns in the one turret move together both in "elevation" and in "train". Any movement of the guns in "elevation" will thus be communicated through the segment 88, gear 87, and so forth, finally on to the shaft 80, to effect a movement of the contact carrier member 64.

So long as the spring fingers 68 and 69 are resting on the neutral point 52, the gun 38 is in the desired position and the circuit 76' including spring fingers 68 and 69 is open. However, should these fingers be moved off the neutral point, either through a movement of a contact carrier member 64 by means of worm 83 meshing with worm gear 82, or by means of a movement transmitted through the "elevation repeater" 22 to move the elevation telescope cylinder 44, the circuit, including spring fingers 68 and 69, would then be closed as effects this part of the apparatus. The current from this circuit 76', then passes into the armature coils of a motor 89, which is hereinafter to be termed the "A" motor.

Figure 5:
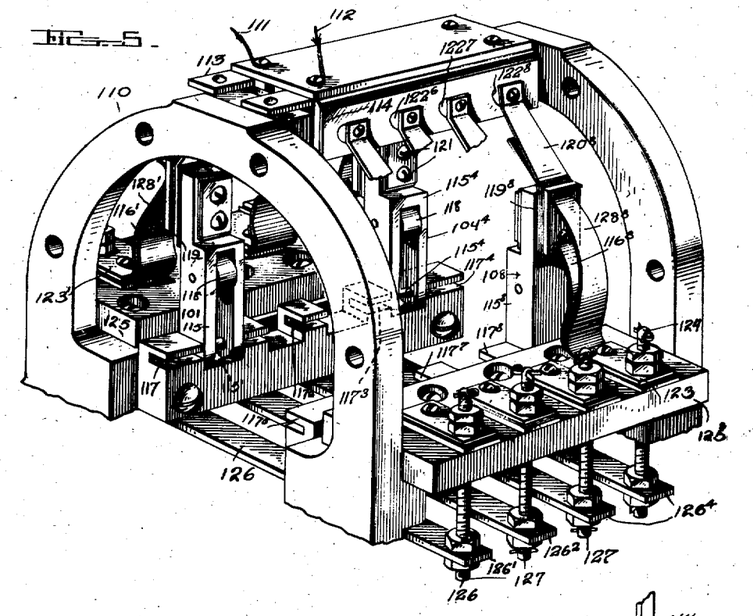
Fig. 5 is a view in perspective of the differential gear governor means, certain parts being omitted for the sake of clearness.
Figures 6, 7:
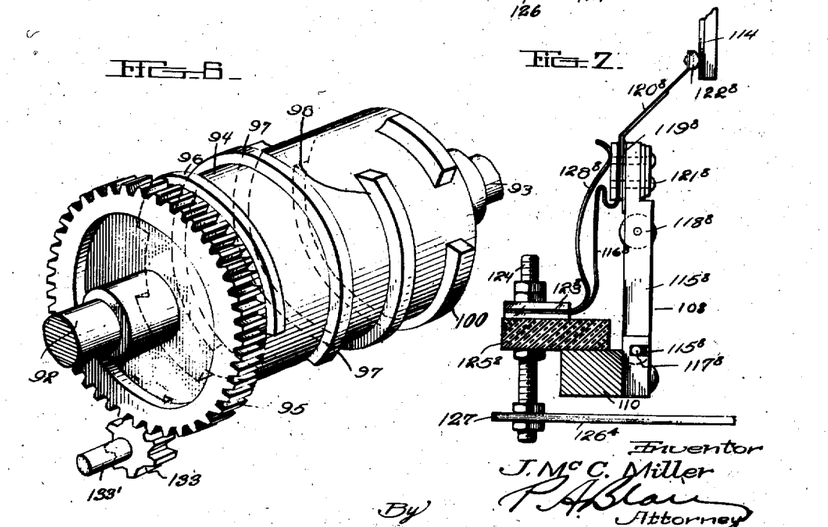
Fig. 6 shows a perspective view of the governor differential.
Fig. 7 is a detail view of one of the contact fingers.

This "A" motor together with a second motor 90, to be known as the "B" motor, and a differential gear arrangement 91, forms a governor system as will be hereinafter understood. The "A" motor 89 and the "B" motor 90 have their field coils constantly energized from the outside circuit 58. A shaft 92 leads from the "A" motor into one side of a differential gear system 91 while a shaft 93, from the "B" motor leads into the opposite side of such differential gear system, which is shown more in detail in Figs. 5, 6, 7, 8, 9, 10 and 11. Fig. 6 shows the differential gear casing 94 into which are led shafts 92 and 93. The casing 94 is provided with the outside gear 95 which is arranged to mesh with gear 133 mounted on shaft 133' leading to the variable speed motor, or tilting box device 134, the movements of which this "governor system" is designed to automatically control. The governing of this motor or hydraulic gear 134 is accomplished by the starting, stopping, reversing, etc., of the "A" and "B" motors in the following manner: It has been seen in the foregoing description of the circuit closing and opening means that the "A" motor will start off in one direction or the other when fingers 68 and 69 are displaced to one side or the other of the neutral point 52; and this will result in turning the differential housing 94, provided an equal and opposite movement is not at the same time transmitted to the differential housing by way of shaft 93 attached to the "B" motor. A reference to Fig. 6 will show that this differential housing is fitted with a number of cams 96, 97, 98 and 100 forming the actuating means for an automatic starting and reversing device for the "B" motor. These cams are adapted to coöperate with spring pressed roller fingers 101, 102, 103, 104, 105, 106, 107 and 108, the general arrangement of which is shown in Fig. 5. The details of these fingers are shown in Fig. 7, and they are of identical construction. In Fig. 7, is indicated the construction of the finger designated broadly as 108 in which $122^8$ is a contact pad, $116^8$ and $120^8$ conductors of spring brass, $119^8$ is insulation, $121^8$ represents screws or the like, $128^8$ is a spring which tends to force finger 108 into contact with plate 114, $118^8$ is a roller which is actuated by cam 100 when the cam shaft is in its operating position inside frame 110, $115^8$ is a supporting part with a groove $115^{8*}$. The finger will turn about pin $117^8$ when actuated by cam 100 on cam roller $118^8$. The action of the cams is to raise and lower these fingers at the proper instant, so that current may be taken by the fingers from positive plate 114 and negative plate 113 and sent to the armature of the "B" motor, so as to start, accelerate, or reverse it automatically. This operation can best be understood by a reference to Figs. 8, 9, 10, and 11 which are diagrammatic representations of the electrical equipment detailed in Figs. 5 and 7.

Figure 3:
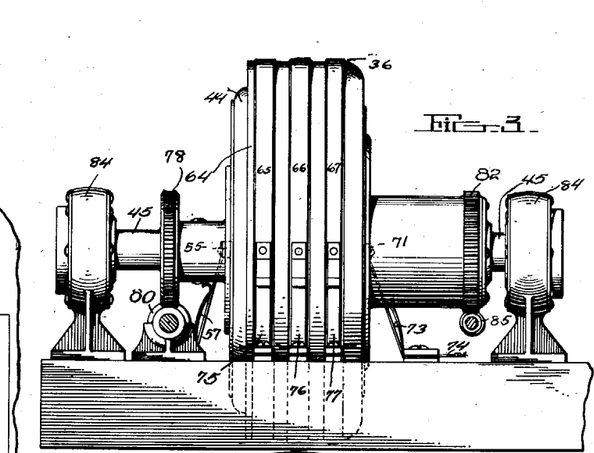
Fig. 3 is a view in side elevation of the "hunting" device.
Figure 4:
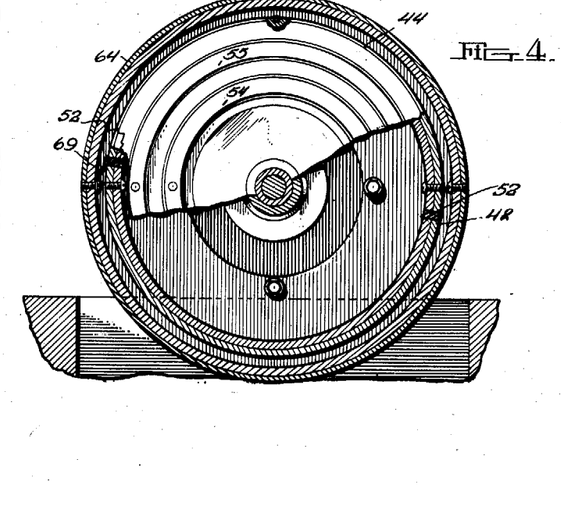
Fig. 4 is a section along the line 4—4 in Fig. 2.
Figure 8:
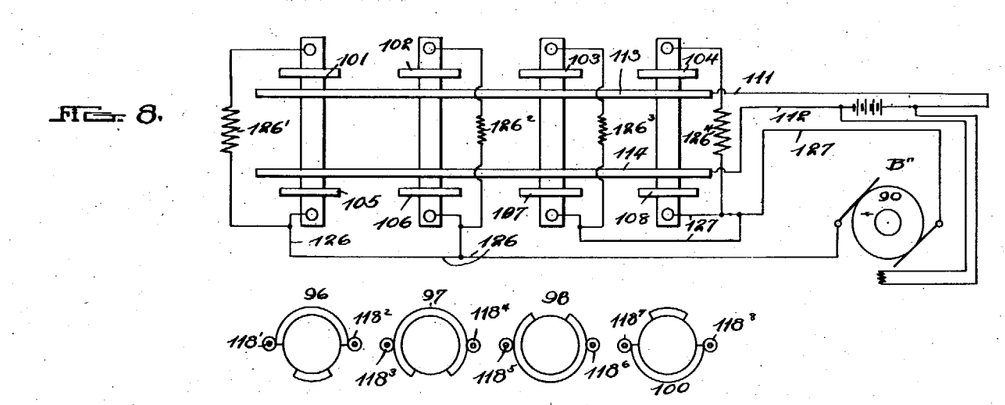
Figs. 8, 9, 10 and 11 are diagrammatic views of the electrical connections used in starting, stopping, reversing, and controlling the speed of the "B" motors.

Referring to Fig. 8, the system is here shown to be in the neutral position corresponding to the neutral position of the fingers 68 and 69 on the contact closing device shown in Figs. 2, 3, and 4, at which time neither the "A" nor the "B" motor is in motion, and the control member 133' of the variable speed motor or hydraulic gear 134 is also in the neutral position. The cams 96, 97, 98, and 100 are in such positions that the cam rollers $118^1$, $118^2$, $118^3$, $118^4$, $118^5$, $118^6$, $118^7$, and $118^8$ are raised, thereby preventing any current from the positive and negative plates 114 and 113 from reaching the armature of the "B" motor 90.

Figure 9:
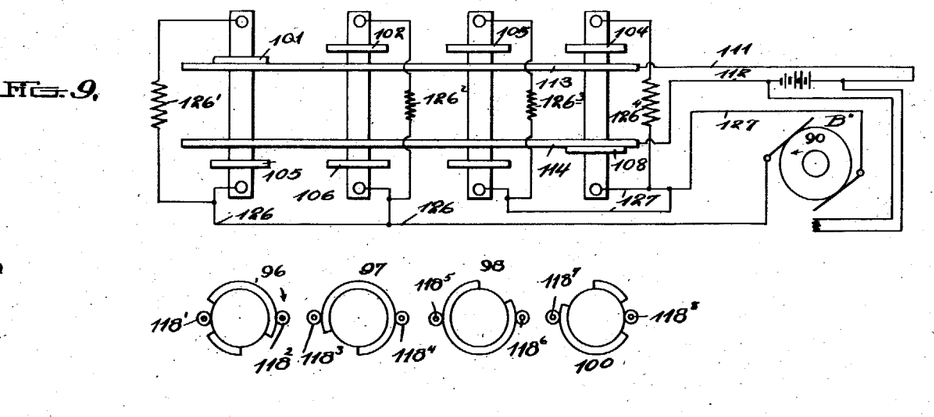

Fig. 9 indicates the condition arising when the contact fingers 68 and 69 have started the "A" motor rotating in a clockwise or positive direction, resulting in the following action: Cam rollers $118^1$ and $118^8$ have fallen into slots in cams 96 and 100 respectively thus closing the following circuit: from source of electricity through lead 112 to plate 114 through finger 108 through lead 127 through brushes and armature of motor 90, through lead 126 to finger 101 via resistance element 126' to plate 113 and lead 111 back to source of electricity. This starts the "B" motor in a negative or counterclockwise direction. Owing, however, to the presence of a resistance element designated as 126' on Figs. 5 and 8, now in circuit with the armature of the "B" motor, the latter will be making less than full speed, and consequently less than the speed at which the "A" motor is turning. As a result the differential housing 94 and the gear 95 will turn, thus operating gear 133 and shaft 133' controlling the hydraulic gear 134. An inspection of Fig. 9 will indicate that this rotation will quickly result in setting up the following conditions: fingers $118^1$ and $118^8$ will be raised out of contact with plates 113, 114, simultaneously rollers $118^3$ and $118^6$ will fall into slots, thereby bringing fingers 103 and 106 into contact with plates 113 and 114 respectively. The result will be that the armature circuit of the "B" motor will be completed through finger 107, lead 127, brushes and armature 90, lead 126, and back to plate 113 through resistance $126^2$ which is made less than the resistance of element 126' thereby allowing more current to flow through the armature of the "B" motor and speeding it up. The value of the total resistance of the "B" motor armature circuit is designedly made equal to that of the "A" motor circuit under these conditions, so that these motors are now turning the opposite ends of the differential gear system at equal speeds in opposite directions, and no further rotation of gears 95 and 133 (see Fig. 6) will take place. At this time the governed hydraulic member 134 is operating at full speed, and its movements may be seen to accomplish the elevation of gun 38 by means of appropriate connections, which are old and well known to the art, and are shown diagrammatically on Fig. 1, wherein motor or hydraulic member 134 turns shaft 136, gearing 137, 138 and 140 thereby operating a form of screw jack attached at 142 to gun 38. The precise nature of these connections is not limited, it being understood that any similar device, such for example, as a hydraulic jack may be used, such use being old and well known.

Further reference to Fig. 1 will indicate that motion of the gun is transmitted by means of appropriate gearing represented diagrammatically as sector 88, pinion 87, shaft 87', gears 86 and 86', to shaft 80, which leads back into the contact closing means shown in Fig. 2 where it serves to drive the cup-shaped member 64 carrying contact points 68 and 69 toward the neutral point 52 on the telescope cylinder 44, with the result that when finger 67 comes in contact with firing point 53 the gun is approximately positioned in elevation and may fire if the other breaks in the firing circuit are simultaneously closed. Reference to Fig. 1 will show that it is considered best to employ identical means for operating the gun in train, and that the firing circuit has been passed through the contact-closing means for train, so that the gun must be positioned within the limits of error permissible in both elevation and in train before it is automatically fired. Reference to Fig. 2 will show that firing contact 53 is somewhat wider than the neutral point 52. This is done purposely in order that the gun may be nearer the correct position when the projectile leaves the muzzle, it being understood that the inertia of the heavy mass of the gun will doubtless carry it beyond the correct angle under any practicable conditions afloat, so that lag due to slow-burning of the powder, etc. can be compensated. It is not considered objectionable for the gun to pass its correct firing angle, since in the present Navy standard director firing system it is customary to fire " on the roll " using a distant fixed telescope and a fixed gun, the firing operator merely "letting go" when his sight " rolls on" thus involving greater angular displacements during the firing interval than this disclosure would involve. It is obvious that, should the gun not fire and should contact fingers 68 and 69 pass beyond the neutral point, an instantaneous reversal of the "A" motor will result. This will reverse the differential shaft 92 (see Fig. 6) and will impart motion to the differential housing 94 and gear 95 in the same direction as that in which shaft 93 is then turning it, thus tending to quickly reëstablish the neutral position for the entire system without any appreciable delay. Should the contact fingers 68 and 69 rest on the neutral point 52 the "A" motor will, of course, tend to stop, so that the "B" motor will return the cam shaft on the differential governor, and also the hydraulic gear 134 to neutral. Reversal of the "A" motor merely hastens this result.

Figure 10:
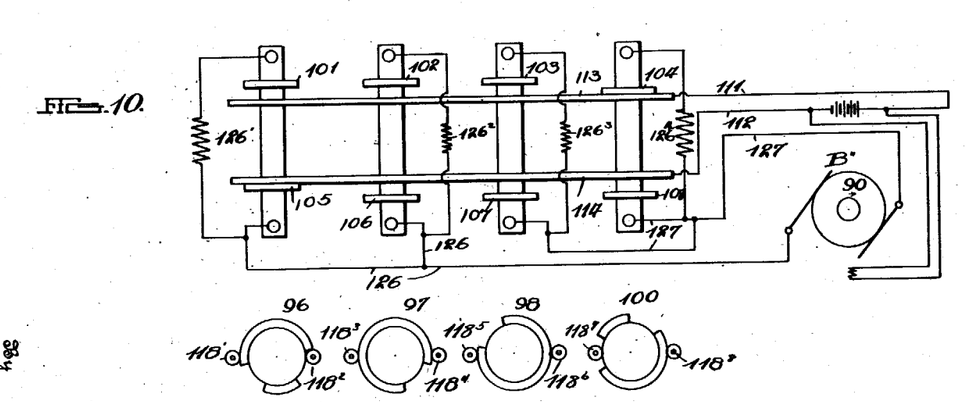

Having thus described the action to be expected when the "A" motor imparts originally a positive or clockwise rotation to shaft 92, I will now explain the action of the mechanism when the "A" motor starts running in a negative or counterclockwise direction (with the system originally in neutral as indicated in Fig. 8.) Negative rotation of the differential housing 94 will result from negative rotation of the "A" motor, and this will bring about the following conditions (see Fig. 10):

Cam rollers $118^2$ and $118^7$ will fall into slots on cams 96 and 100 allowing contact fingers 104 and 105 to make contact with plates 113 and 114 respectively thus energizing the armature of the "B" motor 90 through contact finger 105, lead 126, and in a reverse direction to that previously described through brushes and armature of motor 90 lead 127 resistance element $126^4$ contact finger 104 to negative plate 113 thence to source of current, via negative lead 111. It is considered desirable that resistance element $126^4$ be made approximately equal to that of element $126^1$ so that the starting speed of the "B" motor will be approximately the same in both directions.

Figure 11:
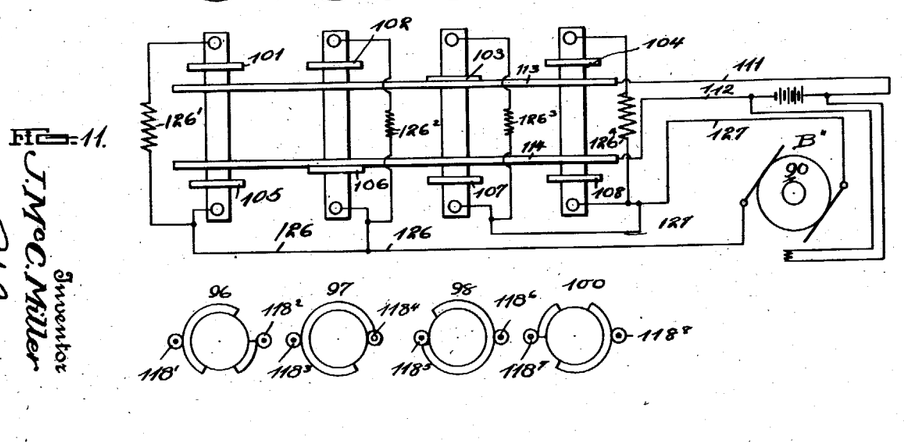

Reference to Fig. 11 will show the result of still further rotation of the differential housing 94 owing to this slower speed of the "B" motor. Cam rollers $118^1$, $118^2$, $118^3$, $118^6$, and $118^7$ are raised while rollers $118^4$ and $118^5$ have fallen into slots in cams 97 and 98 thus permitting fingers 103 and 106 to contact with plates 113 and 114, and completing the "B" motor armature circuit as follows: from source of electricity through lead 112 to plate 114 to finger 106 to lead 126 to motor 90 to lead 127 through resistance element $126^3$ to finger 103 to negative plate 113 thence to negative source via lead 111.

At this time the "B" motor is running at the same speed as the "A" motor owing to the fact that the total resistance of its armature and field circuits under these conditions are designedly made equal to those of the "A" motor. Should the contact fingers 68 and 69 overrun the neutral point 52 under these conditions the action will be similar but in the reverse sense to that already described.

From the above description it will be observed that I do not expect to keep the telescope and the gun constantly at the correct positions, but that I aim chiefly to provide means whereby such positions can be successively approximated within the limits of accuracy of gun and powder, and to fire the gun very nearly at the desired angles so that the final result will be correct. On ships that are gyroscopically or otherwise stabilized this system can be adjusted to give very precise results, and under most practicable conditions with unstabilized gun platforms will be an improvement over present methods. The use of a gyroscopically stabilized telescope is also contemplated and its use needs no illustration.

One other element need now be considered. From the fighting tops or from air craft or elsewhere, the fall of shots from the guns are observed to be "off" the target, or else from data obtained in the plotting room or elsewhere a change in range or direction of motion of the target or the ship on which the guns are mounted or other variation must be corrected for. That means the lay of the guns with relation to that of the telescope must be adjusted. These corrections are applied through movement of the handle 16, which may be electrically or otherwise actuated, which operates a shaft leading into one side of the differential gear system. According as this handle is moved, power is transmitted through the differential gear system, the elevation transmitter 20 is actuated and the process heretofore described is proceeded with to effect a movement of the guns.

I have just described the apparatus which controls the position of the guns in "elevation." As may be seen from Fig. 1 a practically duplicate system is used for effecting the movements of the guns in "train." A brief description of the operation of this feature will be all that is necessary for the purpose of a clear understanding of the invention and this follows:—A differential gear system 30 is actuated either by movements of the telescope 4, through a horizontal angle, that is, in "train," or else by means of the corrections to be applied through the handle 31. Resulting motion of the differential system 30 is transmitted to a synchronous train transmitter 34. This train transmitter 34 actuates a train repeater 36 in the turret, and this, by means of suitable gearing operates to move the telescope "train" cylinder 143 in one direction or the other. The same system of contact fingers and circuit connections are provided as in the case of the elevating mechanism and a contact carrier 144 embraces the train telescope cylinder 143. This contact carrier 144 is connected through gearing with a gear 145 meshing with a training gear 146 of the turret, so that movement of the training gear of the turret will move the contact carrier 144 in one direction or the other, throwing the contact fingers off the neutral point. In the same way a circuit when closed through the contact fingers carried by contact carrier 144, is sent into the armature of the "A" motor 147 which operates one side of a differential system 148 exactly similar to that described in connection with the elevating mechanism. A "B" motor 150 is connected to the opposite side of this differential and contact fingers are actuated in the same way by rotation of the differential casing, to throw circuits 151, 152, 153, and 154 successively into operation, so as to affect the armature coils of the "B" motor 150. The differential system actuates a shaft 155 which controls the tilting plate of a hydraulic motor 156 so that power from a constantly driving motor 157 is sent through the hydraulic motor onto a shaft 158, worm 159, worm gear 160, gear 161 to move the training gear 146 and thus "train" the guns in the turret 40. Thus the operation of the "training" mechanism for the guns is similar in all respects to that of the "elevating" mechanism.

I have so far, for the sake of clearness, described my invention in its application to the control of the guns of one turret, but it is to be understood that my system is more especially adapted for use in controlling the guns in all of the turrets of the ship. I have shown in Fig. 1 a second turret 162, provided with three guns, which guns are controlled from the fighting top 3 in the same manner and by duplicate apparatus of that shown as mounted in turret 40. For this purpose cables 163 and 164 lead from the synchronous transmitters 20 and 34 so that duplicate control systems in the turrets of these other guns are operated to effect a movement of such other guns. For this purpose also a "salvo" or "time firing" contact closer 165 is provided in the fighting top 3 or elsewhere as desired. the circuit 74 controlled thereby passing thence to the firing mechanism 166 of the gun 38 and the other guns in turret 40 and next into spring finger 73 sliding on contact 71 on the outside of the contact carrier member 64, through spring finger 72 and onto firing contact 53. When the firing contact 53 is moved adjacent finger 70, current is carried over into contact arc 67 and out on sliding finger 77. From finger 77 the current passes in series through the firing mechanisms on the breech of the guns in turret 162. When each of the guns is ready for firing, the circuit is closed through the firing mechanism at the breech of each gun and if the circuit is at that time closed through the hunting devices of "elevation" and "train" of all of the guns of the different units. that is, if the fingers are resting on the "neutral point" 52 or are so close to the "neutral point" that the firing contact 53 is engaged above and below by the spring fingers 70 and 72 respectively, the circuit 74 is completed in this respect and a closing of the circuit at the salvo contact maker 165 will automatically fire the guns.

While I have here described a synchronous transmitter coöperating with a synchronous repeater, for communicating motion of the sighting apparatus to the gearing operating the telescope cylinders, it may be understood that other suitable means, either mechanical, hydraulic or the like, may be used to effect this purpose. It is also to be understood that the corrections applied to the differentials at the sighting telescope may be automatically communicated thereto from the plotting room or elsewhere by means of synchronous motors or other equivalent device.

In Fig. 1 I have shown a preferred method of accomplishing this result of electrically transmitting a desired change: 170 is a synchronous transmitter of any well known kind which is operated by handle 169. This device is preferably located in the plotting room. It transmits electrical impulses via cables 171 and 171' to the electrical synchronous receiver 172 where movements of 170 are reproduced in quantity and kind, and result in a predetermined rotation of shaft 14 from which, through the differential gear 13, and transmitter 20, the motion is reproduced as heretofore described through the governor means and gun elevating means.

As may be understood from the foregoing, the present system is adapted to be applied as a distant control means, without dispensing with any of the existing means for training and elevating the guns.

While I have herein described one specific system for accomplishing the purposes of my invention, it must be understood that the present disclosure is merely exemplary and that various changes may be made in different parts of the system to accomplish equivalent results, which changes are intended to be comprehended within the scope of the appended claims. Particularly, I may desire to utilize a large part of the above described system for governing the guns more directly; that is, by omitting the hydraulic variable-speed-gears and applying an equivalent mechanism to the control of either electric, hydraulic, pneumatic or other systems of gun-elevating or gun-training; or I may, if found desirable, substitute some form of hydraulic, electric, or pneumatic "governor" for the "A" and "B" motor "governor-gear" and contact mechanism above described. In such case it is desired that this application be construed as having contemplated the substitution of such practically identical mechanism in order to accomplish equivalent results. It is further intended to apply this invention to such purposes as the steering of ships, torpedoes, dirigible balloons, etc., it being obvious that an invention of this character need not be limited to the control of ordnance members on shipboard.

Having thus described my invention, what I claim is:

1. In combination, ordnance, a sighting means remote therefrom, motor control means associated with said sighting means and said ordnance, and means remote from said sighting means and said ordnance for introducing changes in angular relation made between said sighting means and said ordnance.

2. In combination, ordnance, a sighting means remote therefrom, motor control means associated with said sighting means and said ordnance, and means remote from said sighting means and said ordnance for introducing changes in angular relation between said sighting means and said ordnance comprising a synchronous transmitter and a synchronous receiver.

3. In combination, ordnance including elevating mechanism, a sighting means remote therefrom, motor control means associated with said sighting means and said ordnance, a differential governor means including a motor associated with said motor control means and adapted to control the elevating mechanism of said ordnance for maintaining a predetermined angular relation between said sighting means and said ordnance.

4. In combination, ordnance including training mechanism, sighting means remote therefrom, motor control means associated with said sighting means and said ordnance, a differential governing means including a motor associated with said motor control means and adapted to control the training mechanism of said ordnance for maintaining a predetermined angular relation between said sighting means and said ordnance.

5. In combination, ordnance including elevating and training mechanism, a sighting means remote therefrom, contactor means associated with said sighting means including circuit controlling means for governing the elevating and training mechanism of said ordnance, and firing means associated with said contactor means and said ordnance and made effective when said ordnance is correctly positioned relatively to said sighting means.

6. In combination, a plurality of ordnance units including elevating and training mechanisms, sighting means remote therefrom, governor means associated with said sighting means and said ordnance units including a plurality of motor control means, a plurality of motors controlled by said motor controlled means, differential housings, differential gear trains associated with said motors and said differential housings, cam systems suitably disposed upon said differential housings, a second plurality of motor control means operated by said cam systems and a plurality of second motors associated with said housings and controlled by said first mentioned motor control means.

7. In combination, ordnance, a sighting means remote therefrom, governing means associated with said ordnance including a motor control system and having an automatic firing system, and distant control means between said sighting means and said ordnance for introducing changes in angular relation between said sighting means and said ordnance.

8. In combination, a plurality of ordnance units, elevating and training mechanisms associated with said ordnance units, an automatic firing circuit for said ordnance units, a sighting means remote from said ordnance units, a governing means for controlling said elevating and training mechanisms including a pair of motors normally in a state of rest and differentially connected to said elevating and training mechanisms, control mechanisms for said differentially controlled motors, means for automatically starting, accelerating and stopping said differentially connected motors associated with said elevating and training mechanisms and with said sighting means, whereby motions of said sighting means are reproduced and said ordnance units are established at predetermined angles, and means for automatically closing said firing circuit when said predetermined angles have been established.

9. In combination, ordnance, elevating means associated therewith, automatic firing means for said ordnance, motor control means associated with said firing means and with said ordnance, sighting means associated with said motor control means, differentially connected governor means associated with said motor control means and with said elevating means including one motor normally in a state of rest controlled by said motor control means, a housing including a differential gear train associated with said motor and with said elevating means, and a second motor control means associated with said housing, and a second motor associated with said housing and with said second motor control means.

10. In combination, a sighting means adapted to be maintained in any plane of reference, a body subjected to movements, a plurality of ordnance units on said body, means for establishing a definite relation between the position of said sighting means and said units, and means associated with and made effective on relative movements between said body and said sighting means whereby said definite relation is automatically reëstablished.

11. In combination, a plurality of independently movable ordnance units, elevating and training mechanisms therefor, a sighting means remote therefrom and disposed at certain angles thereto, means for automatically repeating angular movements of said sighting means, motor control means associated therewith and governor means associated with said motor control means and with said elevating and training mechanisms whereby on any relative motion between said sighting means and said ordnance unit said predetermined angles are automatically reëstablished.

12. In combination, a plurality of ordnance units, elevating and training mechanisms therefor, a sighting means remote therefrom, means for establishing certain variable angular relations between said ordnance and said sighting means, means made effective by relative motions between said ordnance means and said sighting means whereby said relations are automatically reëstablished including a contactor means associated with said sighting member and with said ordnance and governor means associated with said contactor means and with said elevating and training mechanisms.

13. In combination, a plurality of ordnance units, a sighting means remote therefrom, a circuit closing means associated with said sighting means and said ordnance units including two coöperating cup shaped members concentrically arranged and provided with suitably disposed contact segments on one member and coöperating contact fingers on the other member whereby motions of said cup-shaped members are made to establish a predetermined angular relation between said sighting means and said ordnance units.

14. In combination, a plurality of ordnance units, a sighting means remote therefrom, a circuit closing means associated with said sighting means and said ordnance units including two coöperating cup-shaped members concentrically arranged and provided with suitably disposed segments on one member and coöperating contact fingers on the other member whereby motions of said cup-shaped members are made to establish a predetermined angular relation between said sighting means and said ordnance units, a firing circuit, and circuit closing means associated with said cup-shaped members and said firing circuit made effective when said predetermined angular relation has been established between said sighting means and said ordnance unit.

15. In combination, ordnance, including elevating and training mechanisms, a sighting means remote therefrom, motor control means associated with said sighting means and said ordnance, differential governor means, including motors associated with said motor control means and adapted to control the elevating and training mechanisms of said ordnance for maintaining predetermined angular relations between said sighting means and said ordnance.

16. In combination, ordnance, including elevating mechanism, a sighting means remote therefrom, motor control means associated with said sighting means and said ordnance, a hydraulic governor means including a motor associated with said motor control means and adapted to control the elevating mechanism of said ordnance for maintaining a predetermined angular relation between said sighting means and said ordnance.

17. In combination, ordnance, including training mechanism, a sighting means remote therefrom, motor control means associated with said sighting means and said ordnance, a hydraulic governor means including a motor associated with said motor control means and adapted to control the training mechanism of said ordnance for maintaining a predetermined angular relation between said sighting means and said ordnance.

18. In combination, ordnance, including elevating and training mechanisms, a sighting means remote therefrom, motor control means associated with said sighting means and said ordnance, hydraulic governor means including motors associated with said motor control means and adapted to control the elevating and training mechanisms of said ordnance for maintaining predetermined angular relations between said sighting means and said ordnance.

Signed at New York, N. Y., this 11th day of October, 1918.

JUSTIN McCARTHY MILLER.